(12) United States Patent
Amiram et al.

(10) Patent No.: US 11,310,466 B2
(45) Date of Patent: Apr. 19, 2022

(54) DEVICE FOR MONITORING VEHICLE OCCUPANT(S)

(71) Applicant: Guardian Optical Technologies Ltd., Tel-Aviv (IL)

(72) Inventors: Yotam Amiram, Tel Aviv-Jaffa (IL); Yoav Zuta, Tel-Aviv (IL); Guy Raz, Binyamina (IL)

(73) Assignee: GUARDIAN OPTICAL TECHNOLOGIES, LTD., Tel Aviv (IL)

( * ) Notice: Subject to any disclaimer, the term of this patent is extended or adjusted under 35 U.S.C. 154(b) by 36 days.

(21) Appl. No.: 16/691,633

(22) Filed: Nov. 22, 2019

(65) Prior Publication Data

US 2021/0160457 A1 May 27, 2021

(51) Int. Cl.
| | |
|---|---|
| *H04N 7/18* | (2006.01) |
| *H04N 5/225* | (2006.01) |
| *G06K 9/20* | (2006.01) |
| *G06K 9/00* | (2006.01) |

(52) U.S. Cl.
CPC ........... *H04N 7/18* (2013.01); *G06K 9/00838* (2013.01); *G06K 9/2036* (2013.01); *H04N 5/2253* (2013.01); *H04N 5/2256* (2013.01)

(58) Field of Classification Search
None
See application file for complete search history.

(56) References Cited

U.S. PATENT DOCUMENTS

| | | | | |
|---|---|---|---|---|
| 6,113,137 A | * | 9/2000 | Mizutani | ............... G01S 7/4802 280/735 |
| 2006/0186651 A1 | * | 8/2006 | Aoki | ................. B60R 21/01538 280/735 |
| 2006/0291223 A1 | | 12/2006 | Scharenbroch et al. | |
| 2008/0036580 A1 | | 2/2008 | Breed | |
| 2008/0048887 A1 | * | 2/2008 | Aoki | ...................... G01S 7/4802 340/937 |

(Continued)

FOREIGN PATENT DOCUMENTS

WO     WO 2020/070402     4/2020

OTHER PUBLICATIONS

International Search Report and the Written Opinion dated Feb. 21, 2021 From the International Searching Authority Re. Application No. PCT/IL2020/051203. (34 Pages).

*Primary Examiner* — Rebecca A Volentine
(74) *Attorney, Agent, or Firm* — Price Heneveld LLP; Brian James Brewer

(57) ABSTRACT

A device for monitoring occupants of seats in a passenger compartment of a vehicle comprises a heat sink divided into a plurality of sections. Each of the sections comprises a base and cooling fins. The bases extend along a common axis and define a central niche therebetween. Structured light sources are attached to the sections. The structured light sources have an optical element for forming a structured light pattern. The structured light sources are oriented along the common axis and at oblique angles to the central niche, such that the structured light patterns, in combination, are directed such that they would cover occupants of seats of the vehicle. A camera is attached to the niche and configured to capture image patterns resulting from distortion of the plurality of structured light patterns by the occupants of the seats.

19 Claims, 10 Drawing Sheets

(56) References Cited

U.S. PATENT DOCUMENTS

| | | | |
|---|---|---|---|
| 2011/0310219 A1* | 12/2011 | Kim | H04N 5/247 |
| | | | 348/36 |
| 2015/0015701 A1* | 1/2015 | Yu | G01B 11/2513 |
| | | | 348/136 |
| 2016/0046261 A1* | 2/2016 | Gulash | G05D 1/0055 |
| | | | 701/23 |
| 2017/0106892 A1* | 4/2017 | Lisseman | B60R 11/04 |
| 2018/0266876 A1 | 9/2018 | Carmon | |
| 2019/0346126 A1* | 11/2019 | Wada | H05K 7/20 |
| 2019/0362167 A1 | 11/2019 | Nakamura et al. | |

* cited by examiner

DEVICE FOR MONITORING VEHICLE OCCUPANT(S)

FIELD AND BACKGROUND OF THE INVENTION

The present invention, in some embodiments thereof, relates to a device for monitoring one or more vehicle occupants, and more particularly, but not exclusively, to a device for monitoring one or more vehicle occupants that is mountable on the roof of a car.

Automated object detection methods and systems, especially for monitoring people in a vehicle, are attracting a continuously growing attention as they may be applied for a plurality of systems, services and/or applications ranging from commercial applications, entertainment applications to automated and/or autonomous vehicles and many more.

This application makes reference to International Application No. IL2018/051307 (Publication WO2019/111244) entitled "Systems and Methods for Adjustment of Vehicle Sub-Systems Based on Monitoring of Vehicle Occupant(s)" filed Nov. 29, 2018, which claims priority to U.S. Provisional Patent Application No. 62/594,043 entitled "Vehicle Intra Passenger Compartment Monitoring and Applications" filed Dec. 4, 2017; International Application No. PCT/IL2018/050761 (Publication WO2019/012534) entitled "Visual, Depth and Micro-Vibration Data Extraction Using a Unified Imaging Device" filed Jul. 12, 2018, which claims priority to U.S. Provisional Patent Application No. 62/531,417, entitled "Systems and Methods for Acquiring Information From an Environment" filed Jul. 12, 2017; International Application No. PCT/IL2018/050762 (Publication WO2019/012535) entitled Systems and Methods for Acquiring Information From an Environment" filed Jul. 12, 2018 which claims priority to U.S. Provisional Patent Application No. 62/531,417 of the same title, filed Jul. 12, 2017; and International Application No. PCT/IL2015/051255 (Publication WO2016/103271) entitled "System and Method for Detecting Surface Vibrations" filed Dec. 27, 2015, the contents of each of which are incorporated herein by reference in their entirety.

The above-referenced patent applications disclose various methods for detecting and analyzing movements of passengers in motor vehicles.

SUMMARY OF THE INVENTION

The design of vehicular monitoring devices must adequately account for limitations in the design of such devices. Such limitations may result from considerations such as minimization of size, ensuring adequate field of view, and accounting for heat generated by the optical components.

In particular, a vehicular monitoring device that is mounted in the roof of a vehicle must be capable of imaging an entire field of view of an interior of a vehicle. This field of view is typically a hemisphere. When the device operates by projecting two laser patterns onto the interior of the vehicle, each laser pattern is projected onto an area covering 60×90 degrees, thus covering together 120×90 degrees. Each laser projector thus covers only a portion (60×90 degrees) of the 180 degree field of imaging. This design overcomes the need to produce an extremely large coverage diffractive optical element. It is difficult to produce a single laser and diffractive optical element capable of covering a large field of view. This difficulty stems from two reasons. First, it is challenging to produce a diffractive optical element that is able to diffract the laser pattern across such an angular span of a typical passenger vehicle, while simultaneously preserving eye safety limits. In particular, increasing the field of view for diffractive optical elements may result in tighter requirements for manufacturing tolerances. Due to manufacturing limitations, such requirements might cause reduced performance, such as an increase in the amount of light that is transmitted in the diffractive optical element's zero-order power (i.e., without any diffraction), which leads to a violation of eye safety limits. Second, the structured light source, such as a laser, in such a system consumes a relatively large amount of power, and generates excess heat.

Another challenge in producing vehicular monitoring systems is managing the heat generated by each of the components of the system, such as the laser, LEDs, the camera, and the control elements.

Yet another challenge in producing vehicular monitoring systems is that stray light can propagate through plastic elements to a lens of a camera. The design of the system thus must ensure that the camera does not capture undesired light.

Yet another challenge in producing vehicular monitoring systems is that a processing module is required to analyze the images generated by the camera and to evaluate changes in the images. The processing module also produces a large amount of heat, and also takes up valuable space in the vehicle's roof.

Yet another challenge in producing vehicular monitoring systems is ensuring that the system is compact, so that it will be easy to install, aesthetically pleasing, and unobtrusive.

Accordingly, it is an object of this invention to develop a device which is capable of producing and analyzing image patterns for detecting movements of passengers of vehicles. It is a further object of this invention to develop a device which produces an image whose field of view extends throughout the vehicle. It is a further object of this invention to develop such a device which is capable of dissipating heat generated by the optical components and computing components thereof, so that generated heat will not damage the components of the device. It is a further object of this invention to develop a device which is compact, easy to install, aesthetically pleasing, and unobtrusive.

According to a first aspect, a device for monitoring occupants of seats in a passenger compartment of a vehicle comprises a heat sink divided into a plurality of sections. Each of the sections comprises a base and a plurality of cooling fins. The bases extend along a common axis and defining a central niche therebetween. The device further comprises a plurality of structured light sources. Each of the plurality of structured light sources is attached to one of the plurality of sections and has an optical element for forming a structured light pattern. The plurality of structured light sources are oriented along the common axis and at oblique angles to the central niche, such that the plurality of structured light patterns, in combination, are directed such that they would cover occupants of seats of the vehicle. A camera is attached to the niche and configured to capture image patterns resulting from distortion of the plurality of structured light patterns by the occupants of the seats.

Advantageously, the heat sink serves as a stable base for each of the optical components, and also dissipates heat generated by the structured light sources, so that the generated heat will not damage the optical components. In addition, the orientation of structured light sources along the common axis and at oblique angles to the central niche causes the structured light sources to cover a wide, hemispherical field of view, which captures the entire interior of the vehicle, and which enables the device to be compact.

In another implementation according to the first aspect, the plurality of structured light patterns, in combination, are directed such that they would cover all of the occupants of the seats. Advantageously, the device may thus be used to provide information regarding each of the occupants of the vehicle.

In another implementation according to the first aspect, the plurality of structured light sources comprises two structured light sources, and each of the two light sources transmits a structured light pattern onto approximately half of a field of view of the camera. Advantageously, dividing the field of view of the camera between two structured light sources mitigates some of the challenge of producing a suitable optical element, because each structured light source needs to be spread only through half the vehicle. In addition, the power consumption and heat generated by each of the structured light sources is similarly reduced. Another advantage of this embodiment is that it permits creation of a symmetric structure for the device as well as for the generated structured light pattern, which simplifies the development of an algorithm for analyzing the images. The symmetric structure is also simpler to integrate into the vehicle. The generated structured light pattern may also assume a more rounded shape, because the center of each structured light source is tilted to the side of the center of the vehicle.

In another implementation according to the first aspect, each of the plurality of structured light sources is attachable to the base at a plurality of angular orientations. Advantageously, the angular orientation of the structured light sources may be adjusted so that the structured light pattern will match the shape of the interior of the vehicle.

In another implementation according to the first aspect, a plurality of unstructured light sources are arranged to illuminate an area targeted with the plurality of structured light patterns. Advantageously, the unstructured light sources may be used to illuminate the interior of the vehicle for capturing of videos by the camera.

Optionally, the camera extends further outward from the heat sink base than each of the plurality of unstructured light sources. Advantageously, this orientation prevents stray light from propagating through plastic elements to the camera lens.

In another implementation according to the first aspect, processing circuitry is configured to analyze changes in the captured image patterns due to movements of the occupants of the seats. Advantageously, the system may thus be used to monitor the occupants of the seats, for example, for attentiveness or health. Optionally, the processing circuitry includes a processor remotely connected to the camera via serial communication. Advantageously, remote connection of the processor allows the device to take less space within the interior of the vehicle and reduces the heat generated by the device in the area of the optical components.

In another implementation according to the first aspect, the device includes a control board for controlling operation of the camera and structured light sources. The control board may control, for example, whether the camera and structured light sources are on or off.

In another implementation according to the first aspect, the fins of the heat sink extend from the base in a direction opposite the attachment points of the plurality of structured light sources and plurality of unstructured light sources. In another implementation according to the first aspect, the fins of the heat sink extend in an orientation that is essentially vertical relative to the ground, when the device is installed in a vehicle. Advantageously, the heat sink is thus configured to dissipate heat generated by the structured light sources. This is especially the case when the fins of the heat sink are oriented vertically.

In another implementation according to the first aspect, the base of each section of the heat sink and the niche function as an optical bench for the camera and the plurality of structured light sources. Advantageously, the dual function of the heat sink allows the device to be compact.

In another implementation according to the first aspect, the heat sink is made of one of aluminum casting, thermoplastic molding, sheet metal, or a mix thereof. Advantageously, these materials are effective at dissipating heat as well as for serving as a stable base for the optical components.

In another implementation according to the first aspect, a motor vehicle includes the device attached to a body of an interior cabin thereof. The device may be integrated within the roof of the interior of the vehicle cabin, may be mounted onto the interior of the vehicle cabin, or may be integrated into an over-head console in the vehicle.

According to a second aspect, a method of monitoring occupants of seats in a passenger compartment of a vehicle is disclosed. The method comprises transmitting a plurality of structured light patterns from a plurality of structured light sources onto occupants of seats of the vehicle. Each of the plurality of structured light sources is attached to a base of one of a plurality of heat sinks. Each of the heat sinks comprises the base and a plurality of cooling fins. The bases extend along a common axis and define a central niche therebetween. The plurality of structured light sources are oriented along the common axis and at oblique angles to the central niche, such that the plurality of structured light patterns, in combination, are directed such that they would cover all of the occupants of seats of the vehicles. The method further comprises capturing, with a camera attached to the niche, image patterns resulting from distortion of the structured light patterns by the occupants of the seats.

Advantageously, the heat sink serves as a base for each of the optical components, and also dissipates heat generated by the structured light sources, so that the generated heat will not damage the optical components. In addition, the orientation of structured light sources along the common axis and at oblique angles to the central niche causes the structured light sources to cover a wide, hemispherical field of view, which captures the entire interior of the vehicle.

In another implementation according to the second aspect, the method further comprises illuminating, with a plurality of unstructured light sources, an area targeted by the plurality of structured light patterns, and capturing with the camera images of said area illuminated by the unstructured light sources. Advantageously, the unstructured light sources may be used to illuminate the interior of the vehicle for capturing of videos by the camera.

In another implementation according to the second aspect, the capturing step comprises capturing image patterns resulting from distortion of the structured light patterns by all of the occupants of the seats. Advantageously, the device may thus be used to provide information regarding each of the occupants of the vehicle.

In another implementation according to the second aspect, the plurality of structured light sources comprises two structured light sources, and the transmitting step comprises transmitting a structured light pattern from each of the two structured light sources onto approximately half of a field of view of the camera. Advantageously, dividing the field of view of the camera between two structured light sources mitigates the challenge of producing a diffractive optical element with a large field of regard or field of view, because each structured light source needs to be spread only through half the vehicle. In addition, the power consumption and heat generated by each of the structured light sources is similarly reduced. Another advantage of this embodiment is that it permits creation of a symmetric structure for the device as well as for the generated structured light pattern, which simplifies the development of an algorithm for analyzing the images. The generated structured light pattern may also assume a more rounded shape, because the center of each structured light source is tilted to the side of the center of the vehicle.

In another implementation according to the second aspect, the method further comprises adjusting the angular orientation of one or more of the plurality of structured light sources on the base. Advantageously, the angular orientation of the structured light sources may be adjusted so that the structured light pattern will match the shape of the interior of the vehicle.

In another implementation according to the second aspect, the method further comprises analyzing with a processor changes in the captured image patterns due to movements of the occupants of the seats. Advantageously, the method may thus be used to monitor the occupants of the seats, for example, for attentiveness or health.

In another implementation according to the second aspect, the method further comprises mounting the device onto a body of the vehicle in a configuration suitable for monitoring occupants of the vehicle.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

Figure 1:
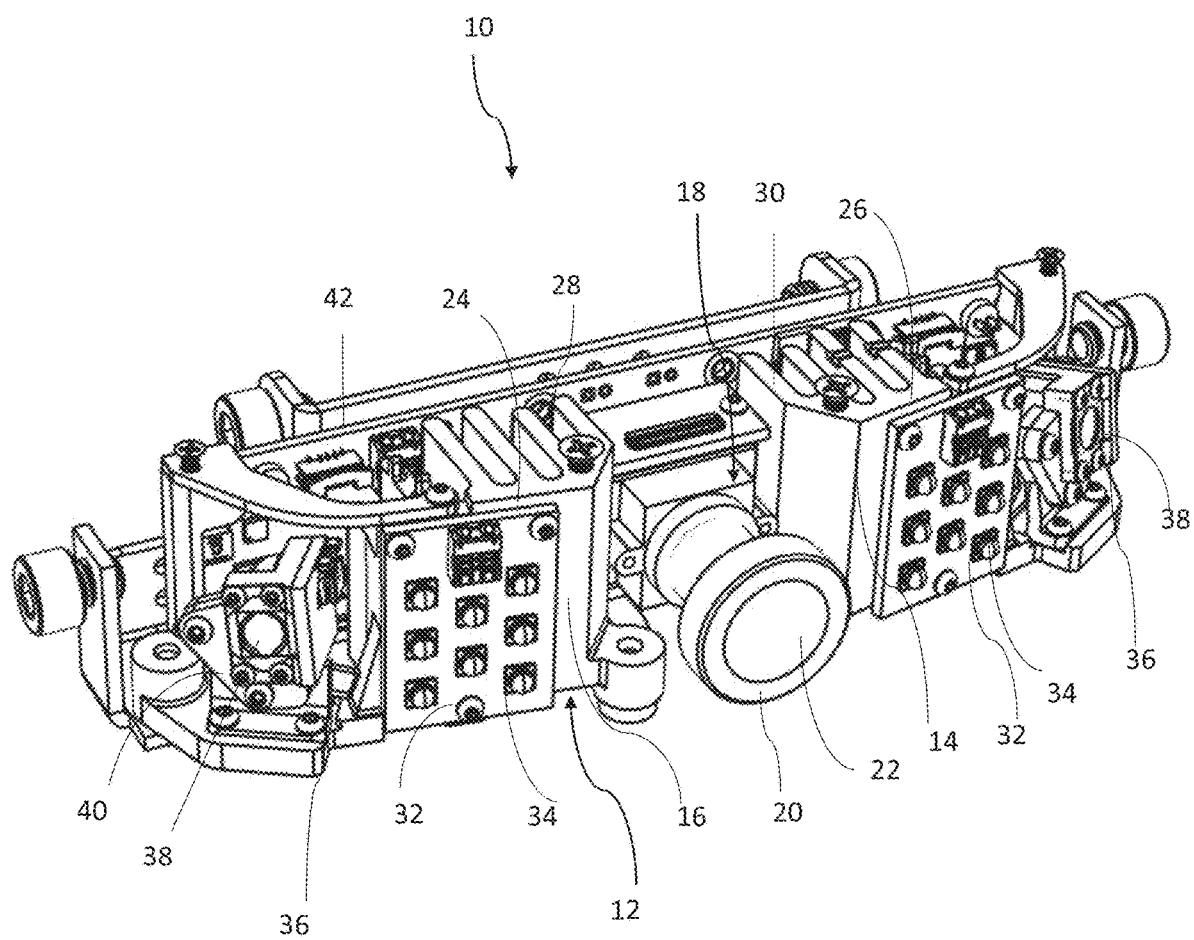
FIG. 1 is a left front perspective view of a device for monitoring occupants of seats in a passenger compartment of a vehicle, according to embodiments of the invention.

The present invention, in some embodiments thereof, relates to a device for monitoring one or more vehicle occupants, and more particularly, but not exclusively, to a device for monitoring one or more vehicle occupants that is mountable in the roof of a car.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As used in this disclosure, the term "optical component" includes any device suitable for generating light or for capturing light as part of an optical system, including, but not limited to, a laser, an LED, or a camera.

As used in this disclosure, the term vehicle means a road based vehicle, for example, a car, a truck, a van, a minivan, a bus, a pick-up truck, a fire truck, an ambulance, a taxi, and a snow removal truck. The vehicle may be an autonomously driven vehicle, a manually driven vehicle, or a semi-autonomous semi-manual driven vehicle.

As used in this disclosure, the terms intra passenger compartment, interior of a vehicle, and cabin may be interchanged. The term vehicle may sometimes refer to the cabin of the vehicle.

As used in this disclosure, the term occupant refers to the driver and/or passengers, which may be sitting at any of the designated seats in the cabin of the vehicle. The occupant may be a human or another living being, e.g., a pet.

Referring to FIGS. 1-5, device 10 is a device for monitoring occupants of seats in a passenger compartment of a vehicle. Heat sink 12 serves as a base for other components of the device 10. Heat sink 12 may be formed of any material suitable to be both a heat sink and a base for other materials, including, but not limited to, aluminum casting, thermoplastic molding, sheet metal, or a mix thereof.

Heat sink 12 is divided into two symmetrical sections 14, 16. Left section 14 includes heat sink base 24 and heat sink cooling fins 28, and right section 16 includes heat sink base 26 and cooling fins 30. The heat sink bases 24, 26 and the cooling fins 28, 30 are oriented substantially perpendicular to each other, and each of the cooling fins 28, 30 is oriented substantially parallel to each other. This orientation maximizes the cooling efficiency of the heat sink 12, as is known to those of skill in the art. In the illustrated embodiment, each section 14, 16 has four cooling fins 28, 30; however, there may also be fewer or more cooling fins 28, 30. In addition, cooling fins 28, 30 are depicted as straight fins. However, cooling fins 28, 30 may also be pins or flared fins.

Each of the sections 14, 16 has an unstructured light source 32 and a structured light source 36 attached thereto. In the depicted embodiment, the unstructured light sources 32 are arrays of light emitting diodes (LEDs) 34, arranged on LED board 33, and powered by LED power connector 35.

The structured light sources 36 may be laser assemblies, for example, Class I lasers. Laser assemblies 36 are attached to the sections 14, 16 with brackets 40. Each laser assembly may consist of a plurality of lasers that are collimated or semi-collimated, in the manner described at pages 7-10 of International Application No. PCT/IL2018/050762 (Publication WO2019/012535). The lasers may transmit light in the visual range, and/or the near-infrared range. In exemplary embodiments, the lasers transmit a beam at 830 nm or at 940 nm. Optical elements 38 are embedded within structured light sources 38. Optical elements 38 may be diffractive optical elements. Optical elements 38 may split a beam (collimated or not collimated) generated by structured light sources 36 into a structured light pattern.

Niche 18 is configured at the center of device 10. Sections 14, 16 extend along a common axis, and define niche 18 therebetween. Structured light sources 36 and unstructured light sources 32 are oriented along the common axis, at oblique angles to the niche 18.

Camera 20 is mounted onto the heat sink base 12 within niche 18. In one embodiment, the camera 20 is a CMOS image sensor with resolution of 1944×1204, or 2.3 megapixels. Camera 20 may include a photodiode array, as disclosed in International Application No. PCT/IL2015/051255 (Publication WO2016/103271). The camera 20 may detect light in the visual range and/or the near infrared range.

Lens 22 is configured at the end of the camera 20. Lens 22 may be an afocal fisheye lens. In an exemplary embodiment, lens 22 may have a field of view of 180 degrees, an image circle 3.5 mm diameter, and an equivalent focal length of 1.05 mm. Camera 20 and lens 22 may have the characteristics of the camera and lens described at page 11 of International Application No. PCT/IL2018/050762 (Publication WO2019/012535), and pages 29-30 of International Application No. IL2018/051307 (Publication WO2019/111244).

Camera 20 extends further outward from the heat sink base 12 than each of the plurality of unstructured light sources 32 and structured light sources 36. This extension of the lens 22 prevents stray light from propagating through plastic elements (e.g., plastic material used to cover device 10) to the camera lens 22. Thus, light from the interior of the cabin is captured by the lens 20, without any interference from components of device 10 itself.

Figure 2:
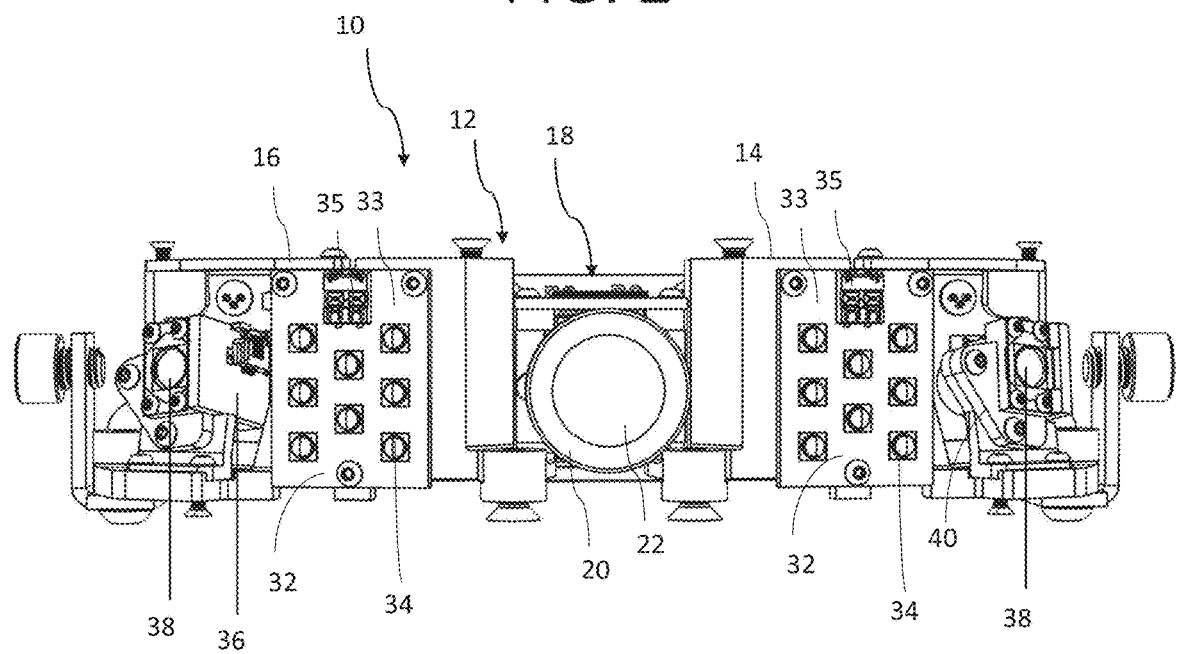
FIG. 2 is a front elevational view of the device of FIG. 1, according to embodiments of the invention.
Figure 3:
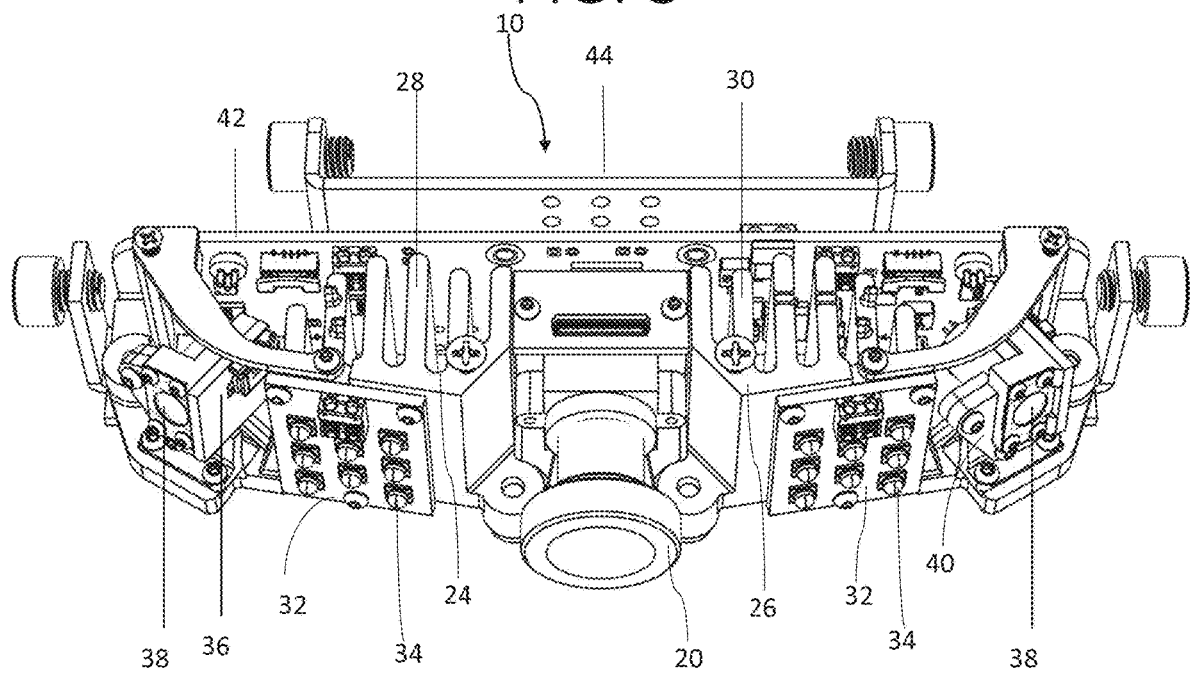
FIG. 3 is an upper perspective view of the device of FIG. 1, according to embodiments of the invention.
Figure 4:
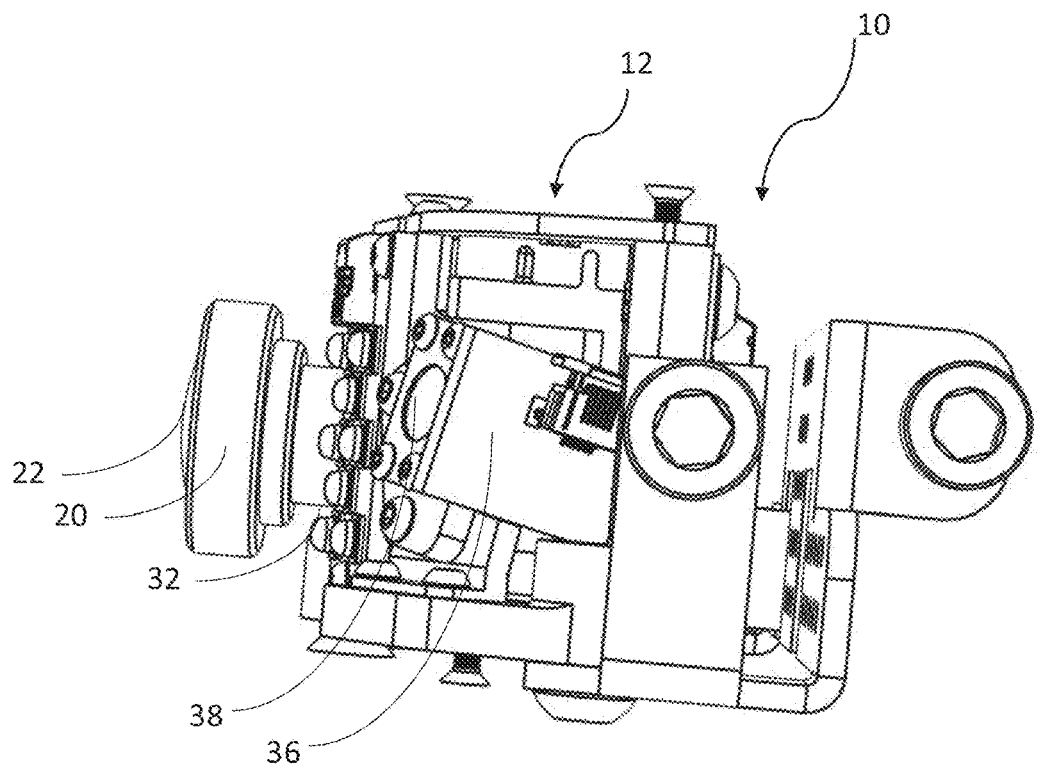
FIG. 4 is a right side elevational view of the device of FIG. 1, according to embodiments of the invention.
Figure 5:
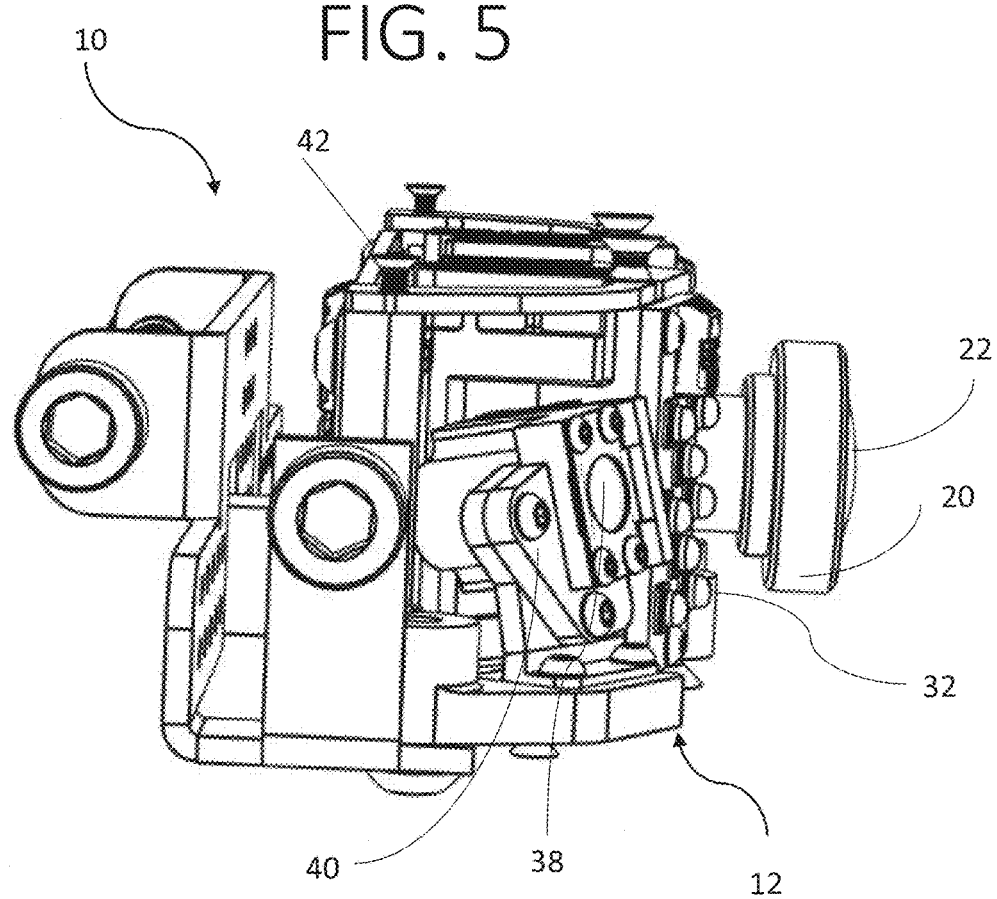
FIG. 5 is a left side elevational view of the device of FIG. 1, according to embodiments of the invention.

As can be seen best in FIGS. 1-3, sections 14, 16 and niche 18 serve a dual function of both a heat sink and an optical bench (for structured light sources 36, unstructured light sources 32, and camera 20). This dual function helps device 10 be manufactured compactly.

Heat sink 12 may be made of any material suitable for functioning both as a heat sink and as an optical bench. To serve as an optical bench, especially for the structured light sources 36, the heat sink base 12 needs to have high dimensional stability (rigidity). This stability is quantifiable by angular tolerance. In exemplary embodiments, the camera 20 to laser assembly 36 alignment is kept fixed to $\frac{1}{16}$ of a degree over the life time of the device 10 and across varying environmental conditions. Exemplary materials include aluminum casting, thermo-plastic molding, sheet metal, or a mix thereof. These materials are effective at dissipating heat as well as for serving as a base for the optical components.

Referring back to the heat sink 12, and as seen best in FIGS. 1 and 3, the cooling fins 28, 30 of the heat sink 12 extend from the heat sink bases 24, 26, in a direction opposite the attachment points of structured light sources 36 and unstructured light sources 32. The heat sink is thus configured to maximize its dissipation of heat generated by the structured light sources 36 and unstructured light sources 32. Specifically, heat that is generated by the structured light sources 36 and unstructured light sources 32 is transferred from the heat sink base 12 to the cooling fins 28, 30, and is dissipated through the flow of air between cooling fins 28, 30. This mechanism of heat dissipation is based on the principles of natural convection, as is known to those of skill in the art. In the illustrated embodiment, the cooling fins 28, 30 extend in an orientation that is essentially vertical relative to the ground (when the device 10 is installed in a vehicle). An advantage of this embodiment is that natural convection principles typically result in more effective cooling when the cooling fins 28, 30 are oriented vertically.

Device 10 also includes control board 42. Control board 42 may be implemented, for example, as a central processing unit(s) (CPU), field programmable gate array(s) (FGPA), digital signal processor(s) (DSP), and application specific integrated circuit (ASIC). Control board 42 controls operation of the camera 20, structured light sources 36, and unstructured light sources 32. For example, control board 42 may receive and implement instructions whether to turn on the device 10 and/or components thereof. For example, control board 42 may implement instructions to activate device 10 whenever a door to the vehicle is opened, or whenever the vehicle is turned on. Control board 42 may also be configured to include internal feedback loops between various components of device 10. For example, control board 42 may be used to switch the device 10 between operating using the structured light sources 36 and the unstructured light sources 32, as will be discussed below. Control board 42 may also be used to coordinate operation of the light sources 32, 36 in sync with the camera 20. Control board 42 may be configured to receive instructions from a user, e.g., to activate device 10, or components thereof. Control board 42 need not be configured in the precise location depicted in FIGS. 1-5, but rather may be located in any location suitable for effecting the operations described above.

Figure 6:
FIG. 6 depicts an image of a laser pattern that is viewable by a camera of the device of FIG. 1 when installed in a motor vehicle, according to embodiments of the invention.
Figure 7A:
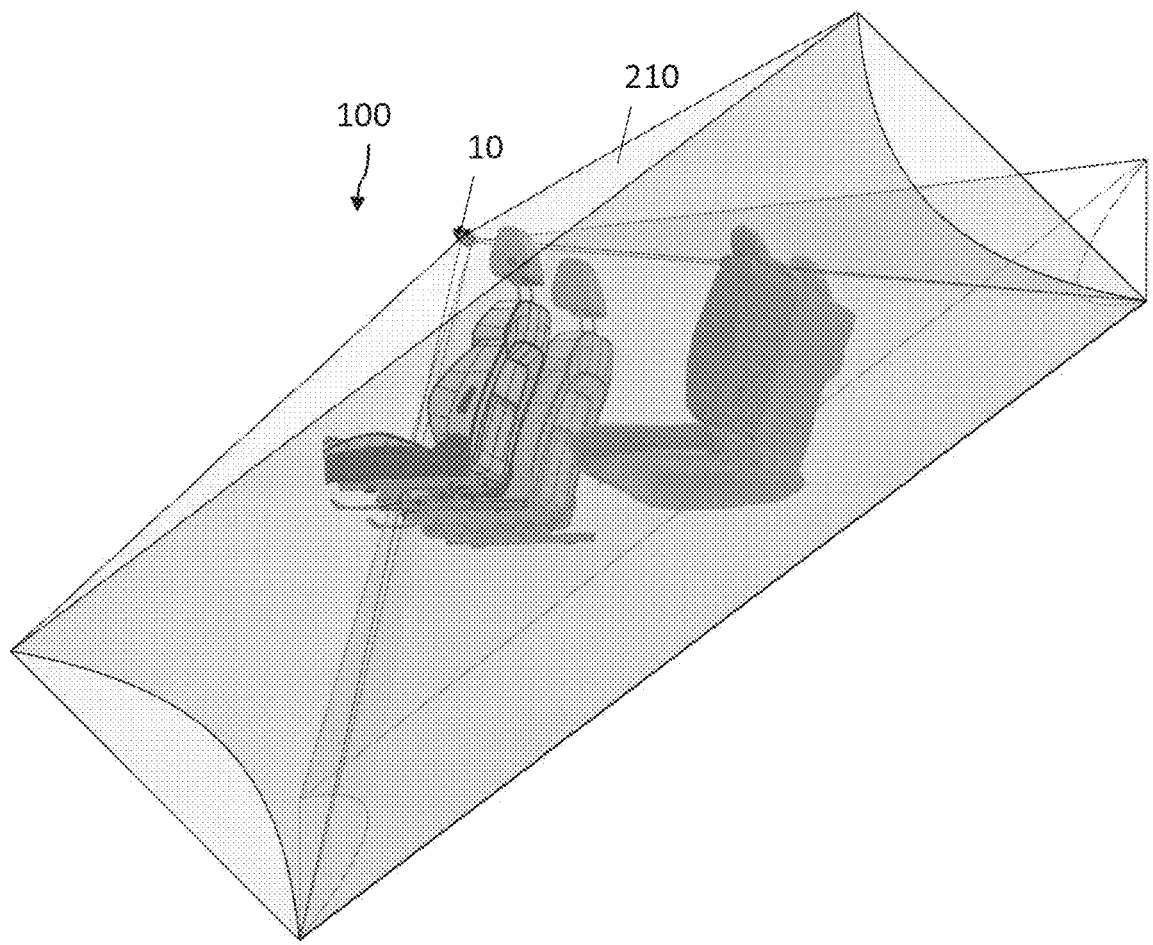
FIGS. 7A and 7B depict the field of coverage within a vehicle of laser patterns generated by the device when installed in a motor vehicle, according to embodiments of the invention.
Figure 7B:
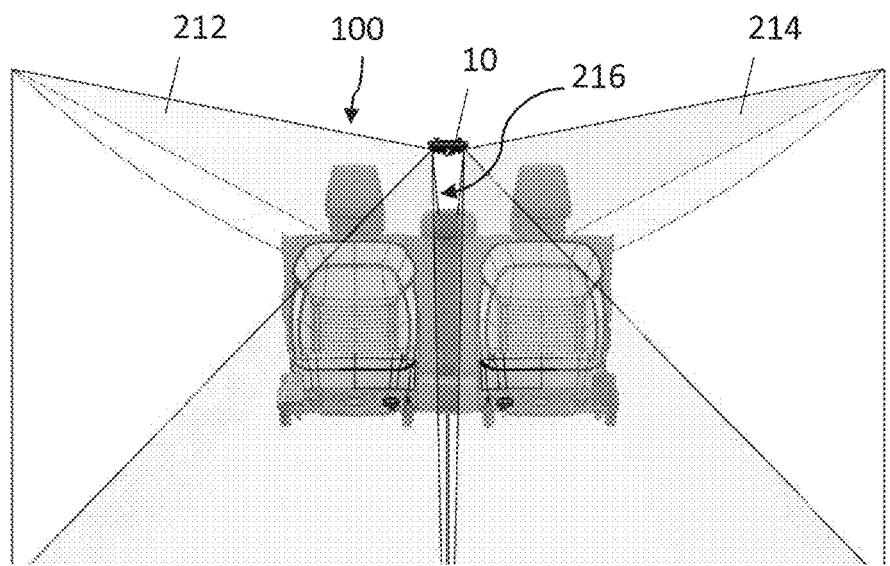

Referring to FIGS. 6, 7A and 7B, operation of device 10 using structured light sources 36 is now described. As shown in FIG. 6, structured light sources 36 generate a structured light pattern 200 in vehicle 100. As discussed above, the structured light pattern 200 is generated by passing light generated by the light sources 36 through an optical element 38, which may be a diffractive optical element. Structured light pattern 200 is a two-dimensional matrix. The structured light pattern may be a laser pattern, as described in International Application No. IL2018/051307 (Publication WO2019/111244) International Application No. PCT/IL2018/050761 (Publication WO2019/012534; International Application No. PCT/IL2018/050762 (Publication WO2019/012535), and International Application No. PCT/IL2015/051255 (Publication WO2016/103271). As shown schematically in FIG. 7A, device 10 is mounted within vehicle 100 such that aggregated field 210 of structured light pattern 200 covers the entire passenger cabin of vehicle 100. When there are two structured light sources 36, each of the two structured light sources 36 transmits a structured light pattern 200 covering partial field 212, 214 onto approximately half of the cabin of the vehicle 100, as shown in FIG. 7B. Partial fields 212, 214, in combination, are directed such that they cover occupants of seats of the vehicle 100.

Using two (or more) structured light sources 36 to generate partial fields 212, 214 provides distinct advantages over using generating a single field 210. Any field generated by structured light source 36 and optical element 38 is necessarily limited by the size and diffractive capabilities of optical element 38. It is easier to develop and manufacture an optical element 38 that is required to diffract a laser beam to cover only half the field of coverage of a vehicle, compared to an optical element for covering a full field of coverage of a vehicle. In addition, using two or more structured light sources 36 reduces the power consumption of each structured light source 36. This, in turn, reduces the excess heat generated by the light sources 36. In addition, the generated fields 212, 214 may assume a more rounded shape, because the center of each structured light source 36 is tilted to the side of the center of the vehicle 100. This rounded shape, in turn, allows for greater coverage of the edges of the cabin of the vehicle 100, which allows device 10 to be manufactured more compactly.

As seen in FIG. 7B, because the structured light sources 36 are oriented at oblique angles to the central niche, a small central section 216 of the cabin, directly in front of the camera 20, is not included in either of partial fields 212 or 214. In a typical passenger vehicle, this central section 216 (the center of the front seating area of the cabin) is never occupied by a passenger, and thus it is not necessary to detect movements of passengers in that spot. In addition, the orientation of the structured light sources 36 at oblique angles helps ensure full coverage of the peripheral areas of the vehicle (e.g., to monitor a passenger resting against the side of the vehicle's cabin). Thus, in the depicted embodiment, the plurality of structured light patterns, in combination, are directed such that they would cover all of the occupants of the seats. When device 10 is configured to be installed in a vehicle with passengers seated across the front row (e.g., a truck with a bench seat) device 10 may be configured to generate a structured light pattern which also covers the central section 216 not covered by the field 200 shown in FIG. 7B.

As discussed, device 10 generates a structured light pattern 200 which is projected from the structured light sources 36 onto the occupants of the seats. This structured light pattern 200 is detectable by camera 20. In the depicted embodiment, in which there are two structured light sources 36, each structured light source 36 transmits a structured light pattern onto approximately half of the field of view of the camera.

All objects within the vehicle cause a distortion in the structured light pattern 200. Such objects include, but are not limited, to occupants, removable objects, vehicle elements, and vehicle structures. The distortions generated by fixed objects typically do not change, even as the vehicle is moving. By contrast, microvibrations caused by movement of occupants of the vehicle cause changes in the laser pattern 200. The camera images the laser pattern 200 at regular intervals. Processing circuitry connected to the camera 20 then compares the imaged speckle patterns and evaluates whether the laser pattern 200 has changed, e.g., due to microvibrations. The operation of device 10 may further correspond with the descriptions found in the above-referenced patent applications.

Device 10 further comprises a serial link to processing circuitry (not shown). The processing circuitry is located at sufficient distance from the device 10 so that the heat generated by processing circuitry does not damage the optical components. For example, the processing circuitry may be embedded within the roof of the vehicle 100, or under the dashboard of the vehicle 100.

The processing circuitry is configured to analyze changes in the image patterns captured by camera 20, due to movements (e.g., microvibrations) by occupants of the seats. The processing circuitry may employ one or more algorithms to evaluate the changes in the image patterns, as discussed the above-referenced patent applications. For example, an absence of significant changes in the laser pattern 200 may indicate that the occupant of the vehicle is in medical distress. As another example, the processing circuitry may detect whether the driver is distracted, for example, by a mobile device. In the depicted embodiment, development of the algorithm may be simplified because the structured light sources 36 project a symmetric laser pattern around a centerline of the vehicle 100. The processing circuitry also may extract depth information about passengers and other objects in the vehicle.

The processing circuitry may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Operation of device 10 using unstructured light sources 32 is now described. In this configuration, the structured light sources 36 are turned off, so that no laser pattern 200 is formed on the occupants of the vehicle. Thus, the camera 20 images the occupants of the vehicle without a laser pattern overlay. For example, unstructured light sources 32 may be used to illuminate the interior of the vehicle when the camera 20 is recording a video. Images of the occupants of the vehicle may be used for evaluation of safety or well-being parameters that cannot be measured with the laser patterns, for example, eyelid detection or gaze detection. Unstructured light sources 32 provide illumination so that the camera 20 will have sufficient light to image the occupants of the vehicle. The use of unstructured light sources 32 is optional, and in an environment with sufficient ambient light, the camera 20 may operate without additional light generated by the unstructured light sources 32.

In one exemplary embodiment of operation of the device 10, the device 10 alternates in a frame-by-frame bases between the use of structured light sources 36 and the use of unstructured light sources 32. Thus, the camera 20 is capable of monitoring, in continuous sequence, safety features that are tracked with the aid of the structured light sources 36 (e.g., movements of the passengers) and safety features that are tracked with the aid of the unstructured light sources (e.g., gaze detection).

Figure 8:
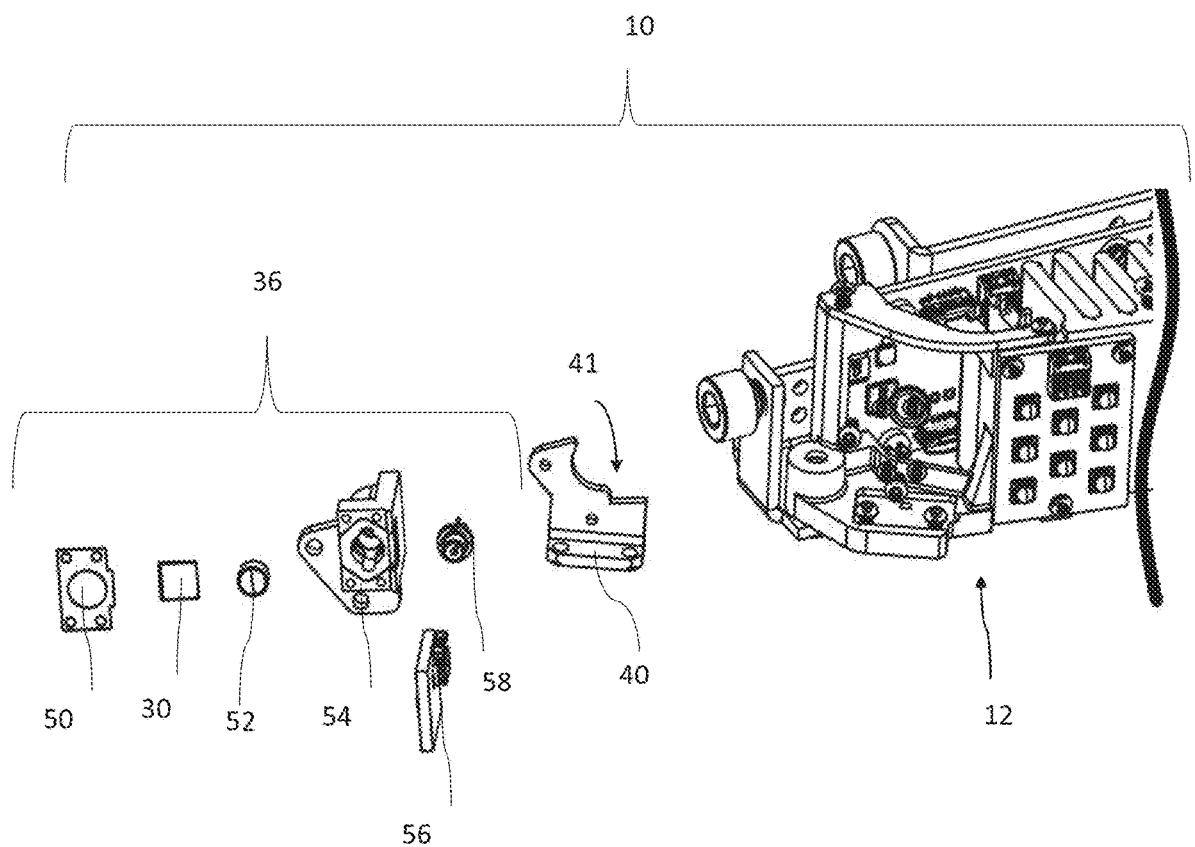
FIG. 8 is a partially exploded view of the device of FIG. 1, depicting elements of a laser assembly.

FIGS. 8 and 9A-9C illustrate a mechanism for adjusting angular orientation that may optionally be included in device 10. In FIG. 8, structured light source 36 is depicted as a laser assembly in an exploded view. The internal components of structured light source 36 include laser lens (e.g., a collimating lens) 52, laser barrel 54, laser photodiode 56, and laser 58. Optical element 38 is secured onto structured light source 36 with optical element cage 50, which attaches to the front-most portion of structured light source 36. The entire structured light source 36 may be securely attached to sections 14, 16 of device 10 by being fitted into cavity 41 of bracket 40.

Figure 9A:
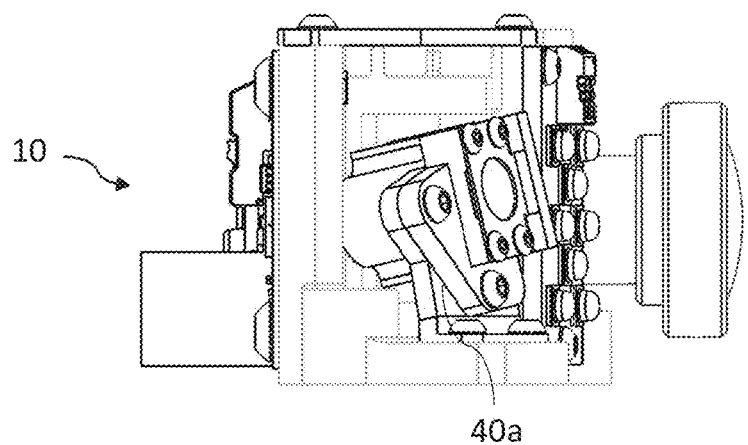
FIGS. 9A-9C are embodiments of the device of FIG. 1 with the laser assembly oriented at different vertical angles.
Figure 9B:
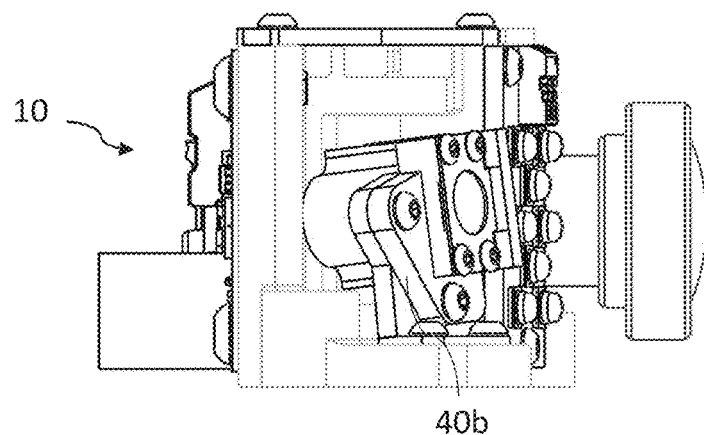
Figure 9C:
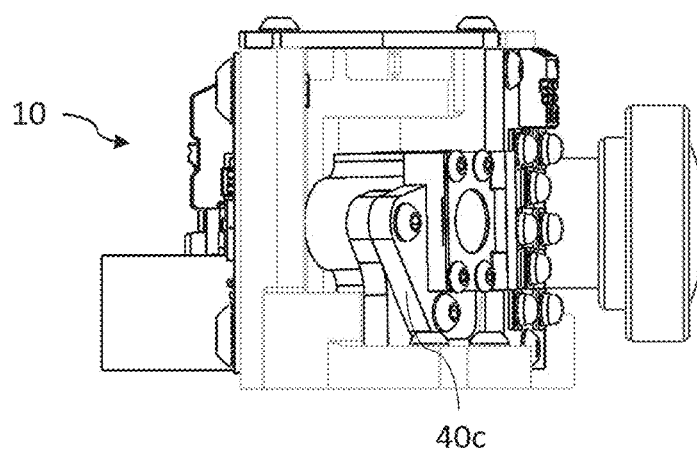

As illustrated in FIGS. 9A-9C, cavity 41 in bracket 40, which is adapted for insertion of laser assembly 36, may be oriented at different angles. For example, the cavity of bracket 40*a* is tilted at a higher angle relative to the bracket 40*b*, which is tilted at a higher angle relative to bracket 40*c*. The angles of brackets 40*a*-40*c* are merely exemplary, and any other angle may be used. Choosing between brackets 40*a*, 40*b*, and 40*c* allows the structured light source 36 to be attachable to the base at a plurality of angular orientations. By adjusting the angular orientation, it is possible to adapt device 10 to different configurations of vehicle cabins.

Alternatively, if the device 10 is manufactured for the dimensions of a particular vehicle, the angle of the bracket 40 may be preselected during manufacture of device 10. In such instances, it will be unnecessary to tinker with the angle of the bracket 40 when installing the device 10.

Figure 10:
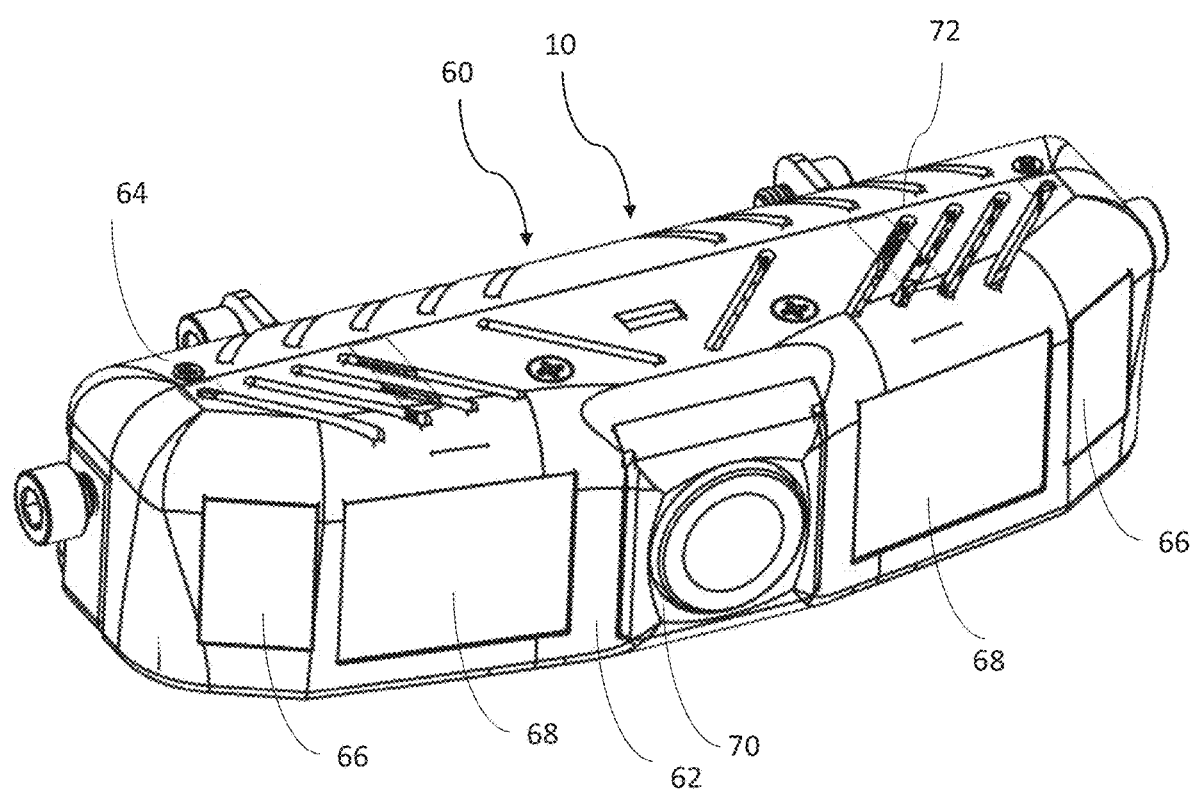
FIG. 10 is the device of FIG. 1 with a cover attached thereto.

Turning to FIG. 10, device 10 may be equipped with cover 60. Cover 60 may be comprised of front section 62 and rear section 64, which fit together over device 10. Front section 62 and rear section 64 may be snap fit together, or may otherwise be joined together using any mechanism known to those of skill in the art. Front section 62 includes structured light source windows 66 and unstructured light source windows 68. Windows 66 cover structured light sources 36, and windows 68 cover unstructured light sources 32. The windows 66, 68 each are of a material that permits passage of light, such as glass, polyethylene, or polycarbonate. The structured light source windows 66 are of a material that does not interfere with the transmission of the structured light patterns. Preferably, the windows are transparent to light in the infrared spectrum but opaque to light in the visible spectrum. In this embodiment, the windows 66 permit light from the structured light sources 36 to pass through the cover 60, while an observer is unable to see through cover 60, for aesthetic reasons. Cover 60 also includes camera cover 70. Camera cover 70 is fitted around camera 20 and covers niche 18. Camera cover 70 does not cover lens 22, so that lens 22 will receive and process the laser pattern reflected from the occupants of the vehicle, without any interference or distortion.

Cover 60 also includes vents 72. Vents 72 permit heat that is dissipated by heat sink 12 to escape the cover 60, so that the dissipated heat does not become trapped within the cover 60 and damage the optical components of device 10.

Figure 11A:
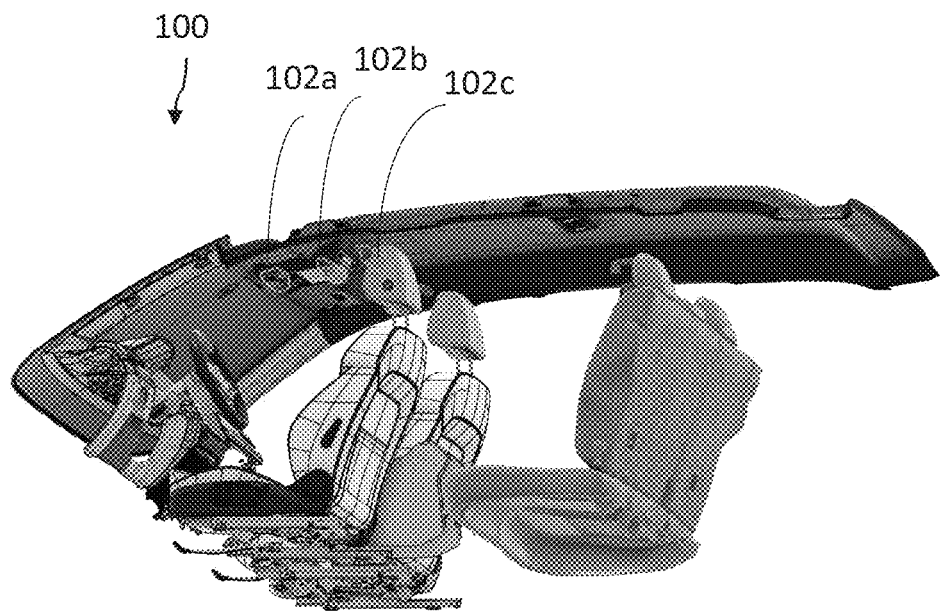
FIGS. 11A and 11B depict an interior of a motor vehicle and various locations therein at which the device of FIG. 1 may be attached.
Figure 11B:
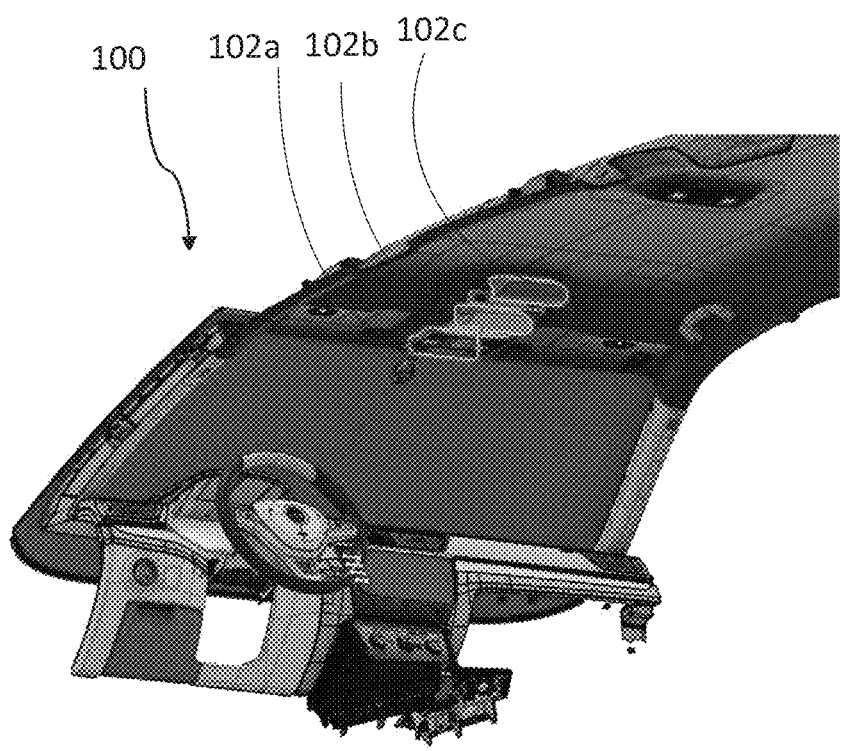

FIGS. 11A and 11B illustrate a mechanism for mounting device 10 into vehicle 100, in a location suitable for monitoring occupants of the vehicle 100. Device 10 may be attached to vehicle 100 at attachment location 102*a*, 102*b*, or 102*c*. Attachment locations 102*a*-*c* are located in the roof of the cabin, at or near the front of the vehicle 100. Attachment location 102*a*-*c* may be selected in order to maximize the field of coverage 210 of the laser pattern 200, and the field of view of the camera 20, as discussed above. Typically, the field of coverage 210 and the field of view of the camera 20 are maximized when the device 10 is mounted at the front of the vehicle 100 and as high as possible. The depicted attachment locations 102*a*-*c* are merely exemplary, and any other suitable attachment location may be chosen. For example, the device may also be incorporated into the vehicle 100 overhead console.

Figure 12:
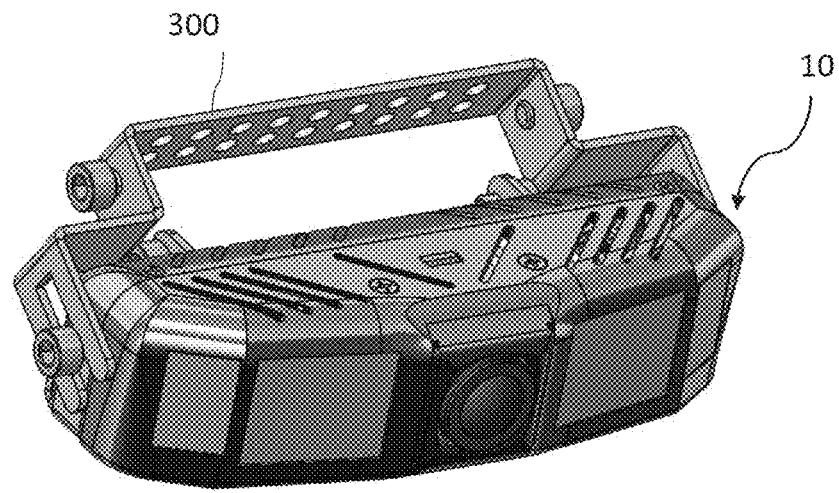
FIG. 12 depicts the device of FIG. 1 with a mounting bracket for mounting onto a vehicle, according to embodiments of the invention.
Figure 13A:
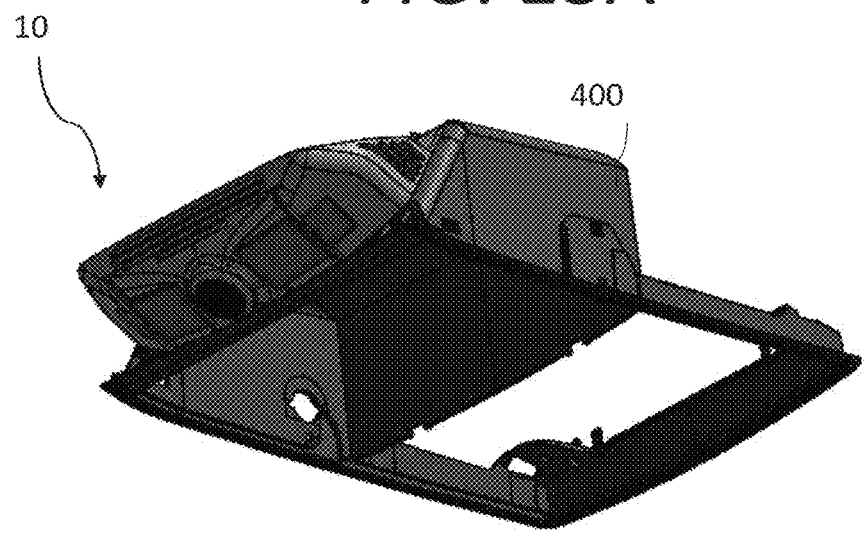
FIGS. 13A and 13B depict a mounting structure for the device of FIG. 1 suitable to be installed in a vehicle, according to embodiments of the invention.
Figure 13B:
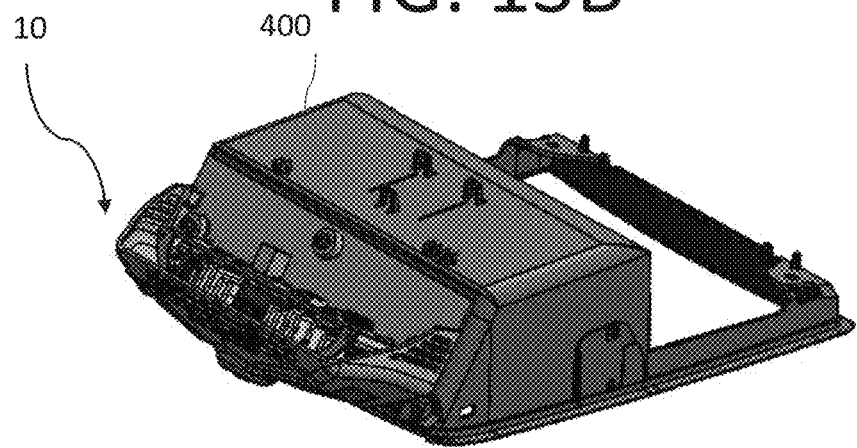

FIGS. 12, 13A, and 13B schematically depict mounting materials that may be used to mount device 10 into a vehicle 100. FIG. 12 depicts bracket 300, which is suitable for mounting device 10 onto a previously finished vehicle. Bracket 300 may be built into, or attached too, the roof of vehicle 100 (for example, at one of attachment locations 102*a*-*c* depicted in FIGS. 11A and 11B). FIGS. 13A and 13B depict casing 400, which is suitable for being built into a roof of a vehicle 100 during manufacture. In the embodiment of FIGS. 13A and 13B, a cavity is thus built directly into the roof of vehicle 100 that is suitable for fixation of device 10.

It is expected that during the life of a patent maturing from this application many lasers, light emitting diodes, structured light sources, and unstructured light sources, will be developed and the scope of the terms laser, diode, structured light source, and unstructured light source is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A device for monitoring occupants of seats in a passenger compartment of a vehicle, comprising:
    a heat sink divided into a plurality of sections, each of the sections comprising a base and a plurality of cooling fins, the bases extending along a common axis and defining a central niche therebetween, wherein the central niche is bordered by a cooling fin of each respective section;
    a plurality of unstructured light sources, each of the plurality of unstructured light sources attached to one of plurality of sections, wherein the fins of the heat sink protrude from the base in a direction opposite attachment points of the plurality of unstructured light sources;
    a plurality of structured light sources, each of the plurality of structured light sources attached to one of the plurality of sections and having an optical element for forming a structured light pattern, wherein the plurality of structured light sources are oriented along the common axis and at oblique angles to the central niche, such that the plurality of structured light patterns are non-overlapping and in combination, are directed such that they would cover all occupants of seats of the vehicle; and
    a camera attached to the niche and configured to capture image patterns resulting from distortion of the plurality of structured light patterns by the occupants of the seats, the camera is further configured to capture video images of an interior of said passenger compartment of the vehicle using illumination of said plurality of unstructured light sources;
    wherein the base of each section of the heat sink and the niche function as an optical bench for the camera and plurality of structured light sources.

2. The device of claim 1, wherein the plurality of structured light sources comprises two structured light sources, and wherein each of the two light sources transmits a structured light pattern onto approximately half of a field of view of the camera.

3. The device of claim 1, wherein each of the plurality of structured light sources is attachable to the base at a plurality of angular orientations.

4. The device of claim 1, wherein the plurality of unstructured light sources are arranged to illuminate an area targeted with the plurality of structured light patterns.

5. The device of claim 4, wherein the camera extends further outward from the heat sink base than each of the plurality of unstructured light sources.

6. The device of claim 1, further comprising processing circuitry configured to analyze changes in the captured image patterns due to movements of the occupants of the seats.

7. The device of claim 6, wherein the processing circuitry includes a processor remotely connected to the camera via serial communication.

8. The device of claim 1, further comprising a control board for controlling operation of the camera, structured light sources, and unstructured light sources.

9. The device of claim 1, wherein the fins of the heat sink extend in an orientation that is essentially vertical relative to the ground, when the device is installed in a vehicle.

10. The device of claim 1, wherein the heat sink is made of one of aluminum casting, thermo-plastic molding, sheet metal, or a mix thereof.

11. The device of claim 1, wherein the plurality of unstructured light sources and the plurality of structured light sources are controlled to be operating alternately such that said camera is monitoring in continuous sequence safety features tracked using the plurality of structured light sources and safety features tracked using the plurality of unstructured light sources.

12. A motor vehicle including the device of claim 1 attached to a body of an interior cabin thereof.

13. A method of monitoring occupants of seats in a passenger compartment of a vehicle, comprising:
    transmitting a plurality of structured light patterns from a plurality of structured light sources onto occupants of seats of the vehicle, wherein each of the plurality of structured light sources is attached to a base of one of a plurality of heat sinks, wherein each of the heat sinks comprises the base and a plurality of cooling fins, the bases extend along a common axis and define a central niche therebetween, wherein the central niche is bordered by a cooling fin of each respective section, and a plurality of unstructured light sources is attached to each of the plurality of sections, wherein the fins of the heat sink protrude from the base in a direction opposite attachment points of the plurality of unstructured light sources, and the plurality of structured light sources are oriented along the common axis and at oblique angles to the central niche, such that the plurality of structured light patterns are non-overlapping and in combination, are directed such that they would cover all occupants of seats of the vehicles, wherein the base of each section of the heat sink and the niche function as an optical bench for the camera and plurality of structured light sources;

capturing, with a camera attached to the niche, image patterns resulting from distortion of the structured light patterns by the occupants of the seats; and capturing, with said camera, video images of an interior of said passenger compartment of the vehicle using illumination of said plurality of unstructured light sources.

14. The method of claim 13, further comprising illuminating, with the plurality of unstructured light sources, an area targeted by the plurality of structured light patterns, and capturing with the camera images of said area illuminated by the unstructured light sources.

15. The method of claim 13, wherein the capturing step comprises capturing image patterns resulting from distortion of the structured light patterns by all of the occupants of the seats.

16. The method of claim 13, wherein the plurality of structured light sources comprises two structured light sources, and wherein the transmitting step comprises transmitting a structured light pattern from each of the two structured light sources onto approximately half of a field of view of the camera.

17. The method of claim 13, further comprising adjusting the angular orientation of one or more of the plurality of structured light sources on the base.

18. The method of claim 13, further comprising analyzing with a processor changes in the captured image patterns due to movements of the occupants of the seats.

19. The method of claim 13, further comprising mounting the device onto a body of the vehicle in a configuration suitable for monitoring occupants of the vehicle.

* * * * *